Dec. 17, 1957     H. P. HASELL     2,816,350
AUTOMATIC SHIELD BENDER AND WELDER
FOR A FILAMENT MOUNTING MACHINE

Filed May 12, 1953     7 Sheets-Sheet 1

INVENTOR
H. P. HASELL.
BY
ATTORNEY

Dec. 17, 1957     H. P. HASELL     2,816,350
AUTOMATIC SHIELD BENDER AND WELDER
FOR A FILAMENT MOUNTING MACHINE
Filed May 12, 1953     7 Sheets-Sheet 2
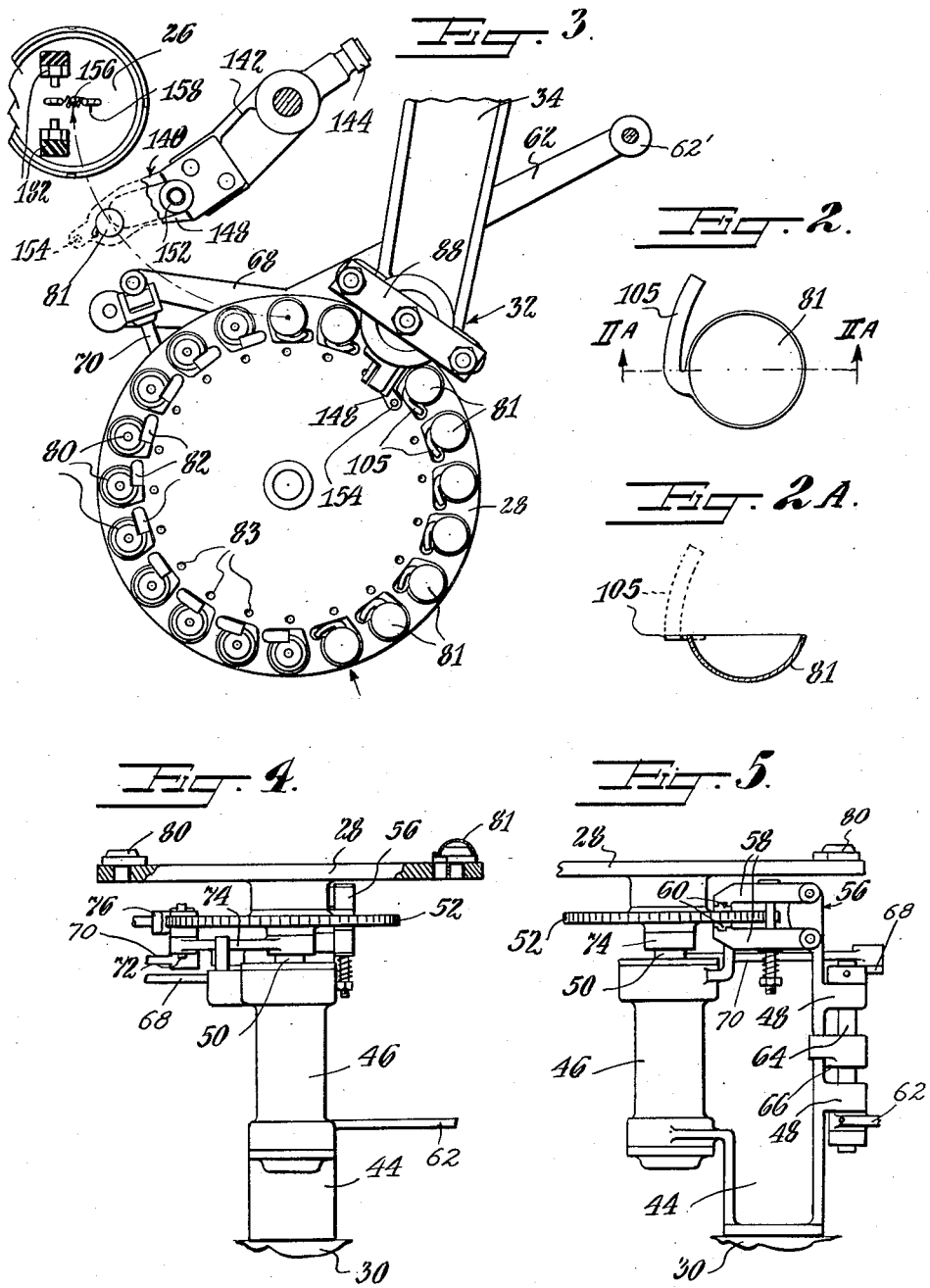
INVENTOR
H. P. HASELL.
BY
ATTORNEY Dec. 17, 1957  H. P. HASELL  2,816,350
AUTOMATIC SHIELD BENDER AND WELDER
FOR A FILAMENT MOUNTING MACHINE
Filed May 12, 1953  7 Sheets-Sheet 3
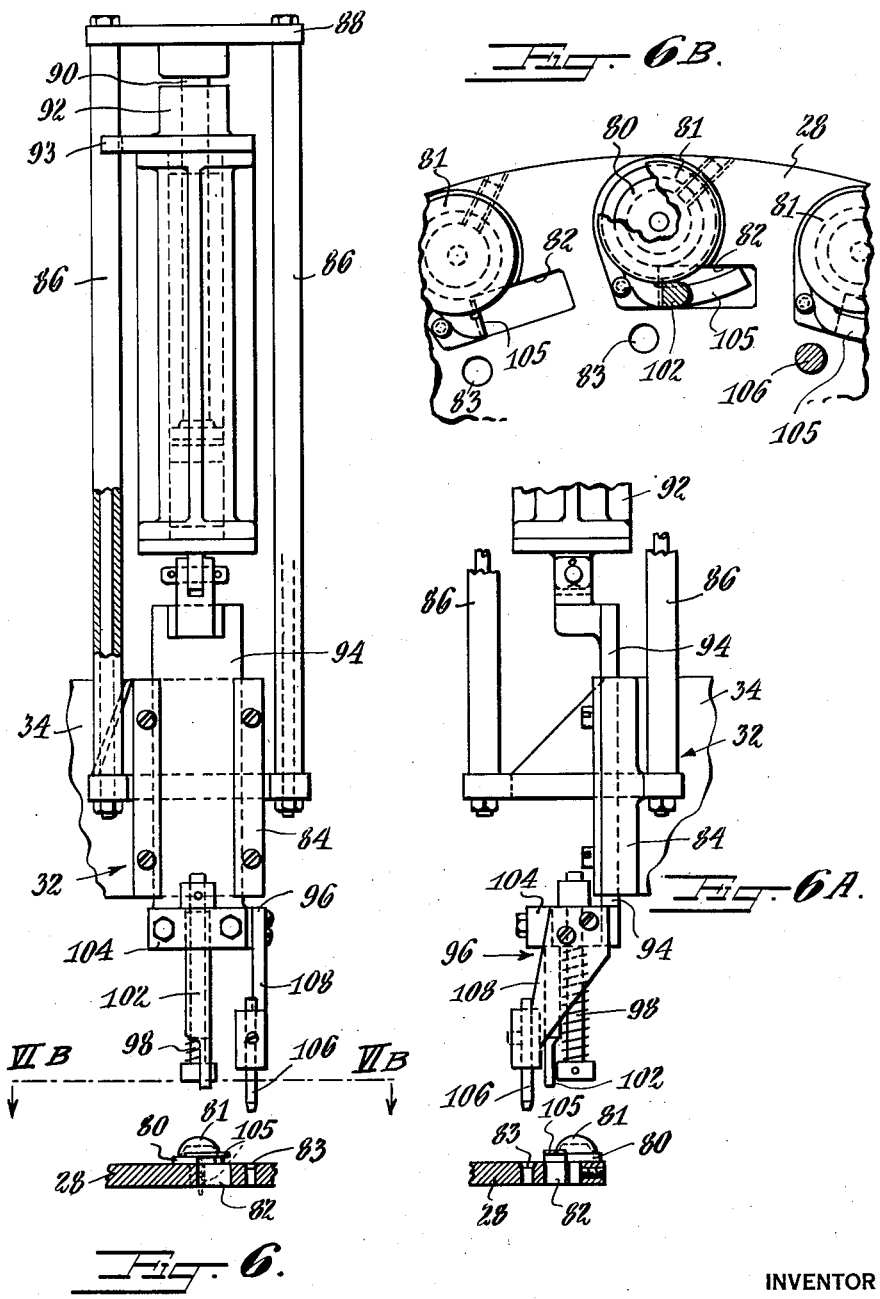
INVENTOR
H. P. HASELL.
BY
ATTORNEY

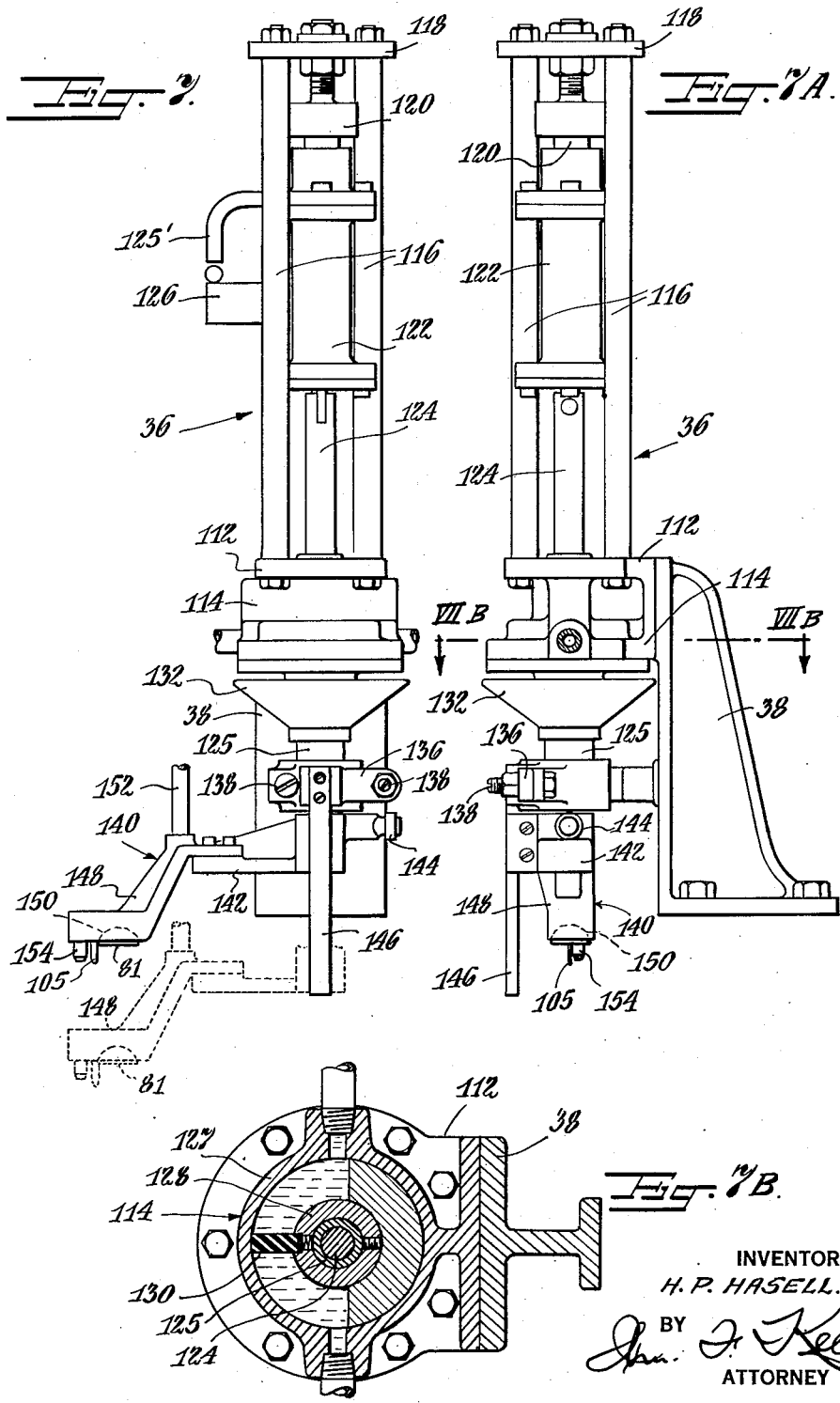

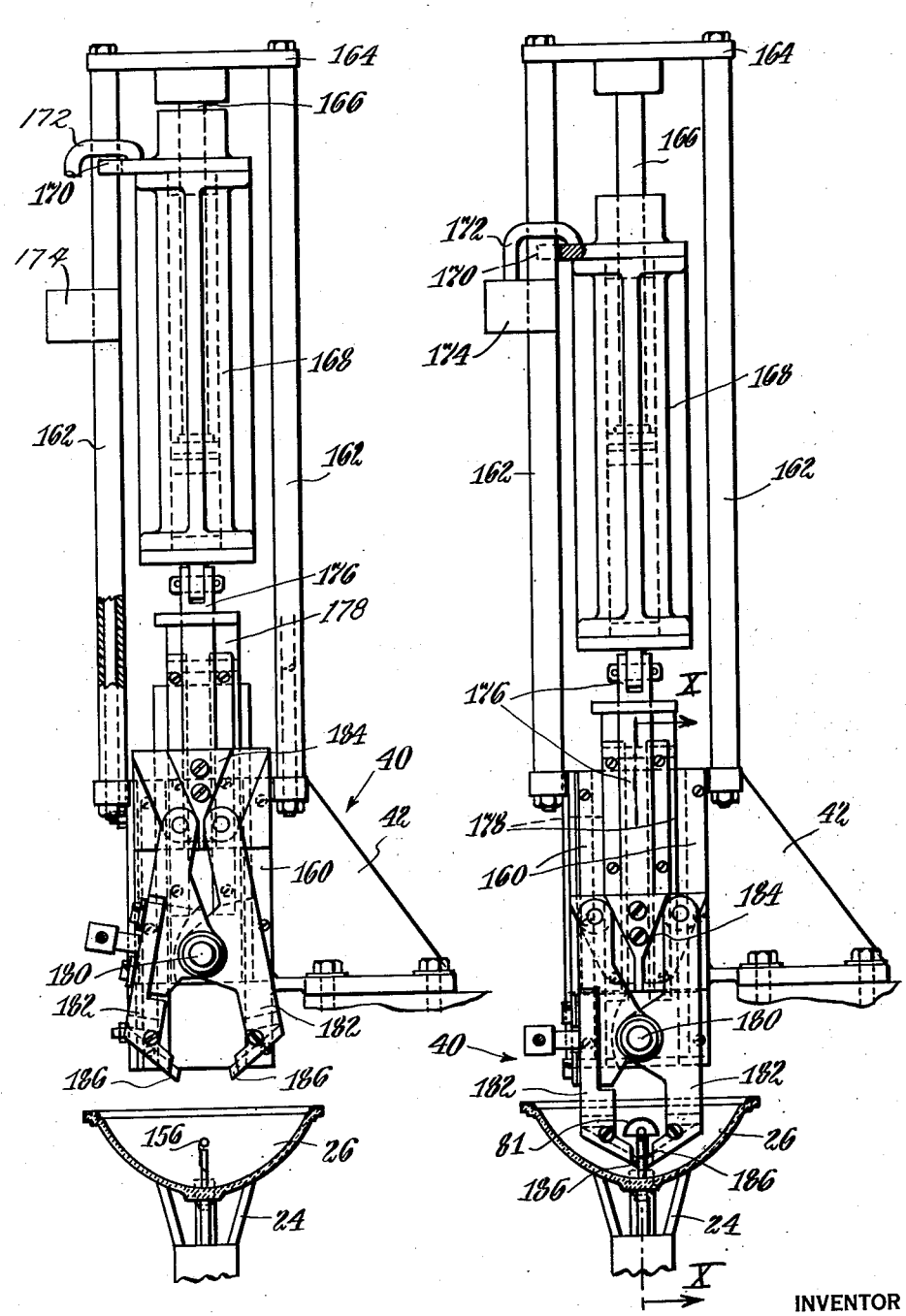

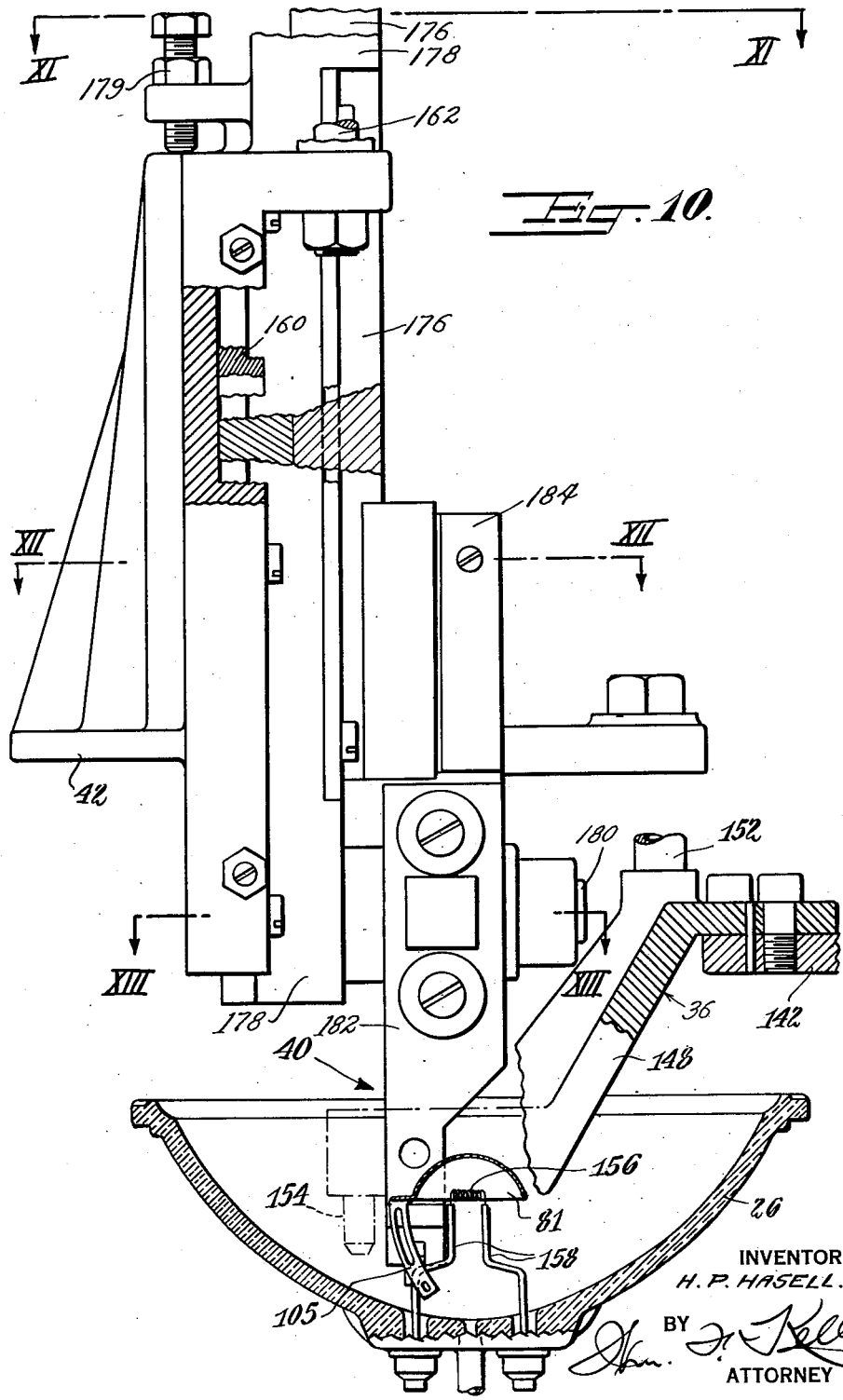

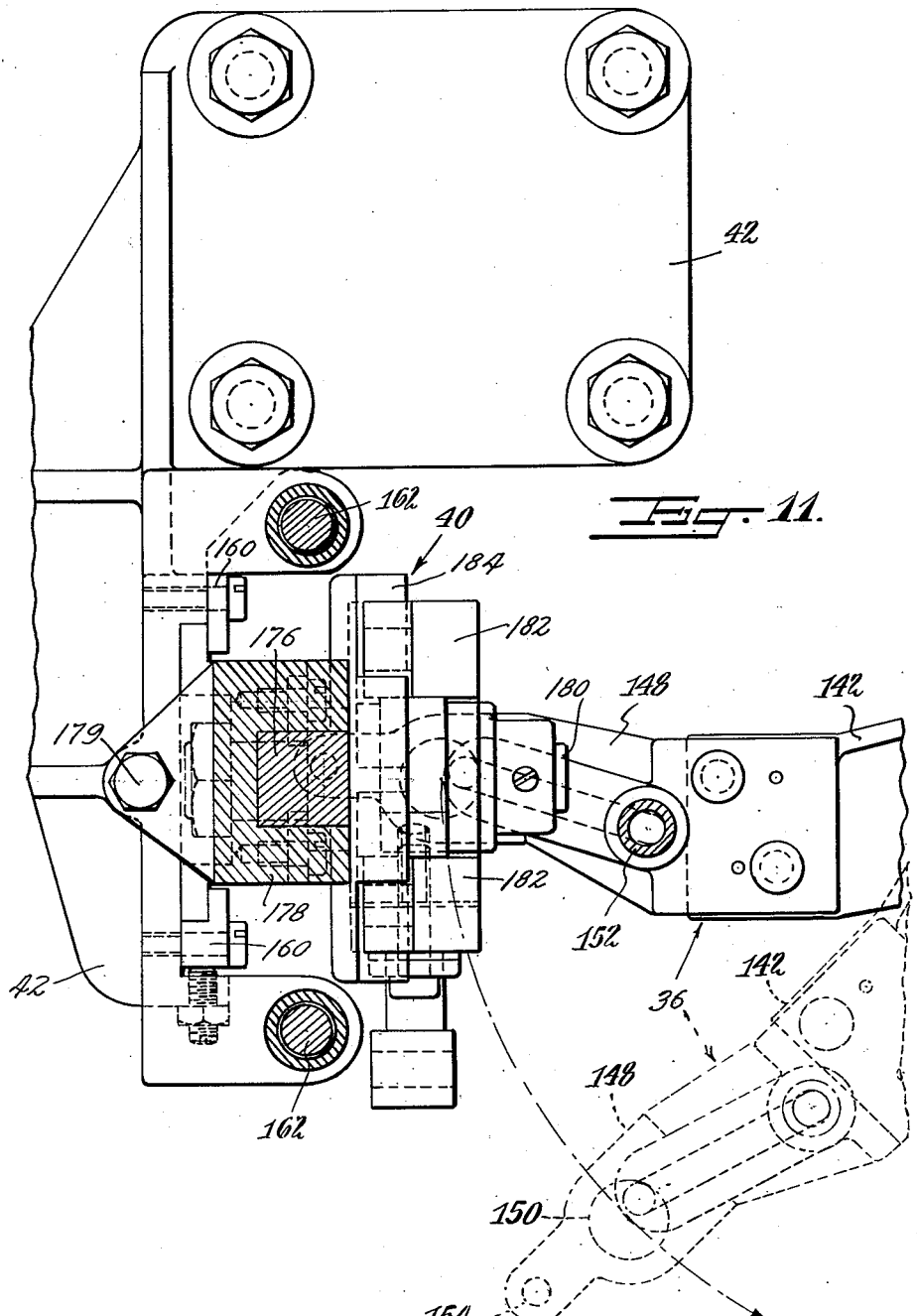

United States Patent Office 2,816,350
Patented Dec. 17, 1957

2,816,350

AUTOMATIC SHIELD BENDER AND WELDER FOR A FILAMENT MOUNTING MACHINE

Henry P. Hasell, Brookdale Gardens, N. J., assignor to Westinghouse Electric Corporation, East Pittsburgh, Pa., a corporation of Pennsylvania Application May 12, 1953, Serial No. 354,601

5 Claims. (Cl. 29—25.2)

The present invention relates to the manufacture of incandescent lamps and, more particularly, to an automatic shield bender and welder for a sealed beam lamp automatic mounting machine.

Sealed beam incandescent lamps generally have a reflector assembly having a plurality of ferrules sealed thereto, and leading-in conductors brazed to the inner portions of the sealed ferrules. A filament is mounted on the upper ends of the leading-in conductors. The sealed beam lamp employed as a spotlight has, in addition, a small inverted cup-like filament shield which eliminates stray foreground illumination by absorbing the direct unreflected light from the filament.

In the past a filament has been mounted on the conductors of the reflector assembly by a filament mounting machine, such as is disclosed in U. S. Patent No. 2,297,950, issued October 6, 1942, to J. Flaws, Jr. and entitled "Filament Mounting Machine." On such a mounting machine the reflector assembly may be loaded at "Station 1," the leading-in conductors positioned at "Station 2," and the lead wires formed to receive a filament at "Station 4." At "Station 5" the upper portions of the now formed leading-in conductors may be trimmed and the upper ends of the now trimmed conductors may be notched for filament mounting at "Station 6." At "Station 8" a filament may be mounted or clamped on the notched conductors. The reflector assembly with a filament mounted thereon is discharged or unloaded at either "Station 9 or 10."

The filament shield, generally an inverted hemisphere or cup having a lower depending mounting leg is usually positioned and welded by hand to the reflector filament assembly.

Hence, it has been found advantageous according to my invention to provide an automatic filament shield bender and welder for "Station 9" of such a filament mounting machine as is disclosed in the above-named patent. I have provided adjacent "Station 9" an indexable shield holder turret, a shield leg bending device, a bent shield transfer device and positioner which will transfer the now bent filament shield into proper alignment with the conductors and the filament mounted on a reflector assembly. In addition, I have also provided an automatic welder which will secure the positioned filament shield on a lead-in conductor above the filament.

In its general aspect, the present invention has the objective of eliminating the hand bending and mounting of a filament shield on a filament reflector assembly for a sealed beam lamp.

A specific object of the present invention is an automatic filament shield leg bending and welding station for an automatic sealed beam incandescent lamp mounting machine.

Other objects of the present invention will become apparent to those skilled in the art to which it appertains as the description thereof proceeds, both by direct recitation and by implication from the context.

In the attached drawings in which like numerals indicate similar parts throughout the several views:

Fig. 2 is a plan view on a larger scale than Fig. 1 of the filament shield before the automatic bending of the mounting leg.

Fig. 2A is a vertical sectional view of the shield along the line IIA—IIA, of Fig. 2 in the direction of the arrows and showing the bent filament shield leg in the dotted lines.

Fig. 3 is a plan view of the shield bending and welding station of my invention and showing a shield holder turret, a shield leg bending device, a transfer device and a shield welder.

Fig. 4 is a front elevational view of a shield holder turret assembly.

Fig. 5 is a side elevational view of the shield holder turret assembly of Fig. 4, viewed from the right side of Fig. 3.

Fig. 6 is a side elevational view of the shield bending device of Fig. 3 at the start of its downward travel and showing the bending of the shield leg in dotted lines.

Fig. 6A is a fragmentary side elevation of the shield leg bending head.

Fig. 6B is a horizontal cross-sectional view, on a larger scale than Fig. 6, of the leg bending operation along the line VIB—VIB, of Fig. 6 in the direction of the arrows.

Fig. 7 is a side elevational view of the transfer device of my invention showing the transfer device at the start of its 90° rotary motion and the pickup of a now bent shield in dotted lines.

Fig. 7A is a front elevational view of Fig. 7.

Fig. 7B is a horizontal sectional view, on a larger scale than Fig. 7, along the line VIIB—VIIB of Fig. 7A in the direction of the arrows and showing the means of operation of the transfer device of my invention.

Fig. 8 is a side elevational view of an automatic shield welding device of my invention in its normal rest position.

Fig. 9 is a view similar to Fig. 8 showing the welding of the now bent filament shield mounting leg to a leading-in conductor of the reflector assembly.

Fig. 10 is a vertical sectional view on a larger scale than Figs. 7, 8, and 9 of the transfer device and the automatic welding device in position for the welding operation along lines X—X of Fig. 9 in the direction of the arrows.

Fig. 11 is a horizontal sectional view of the transfer device and welding device along the line XI—XI of Fig. 10 in the direction of the arrows and showing in the dotted lines the transfer device in an intermediate position of its horizontal rotary travel.

Figure 12:
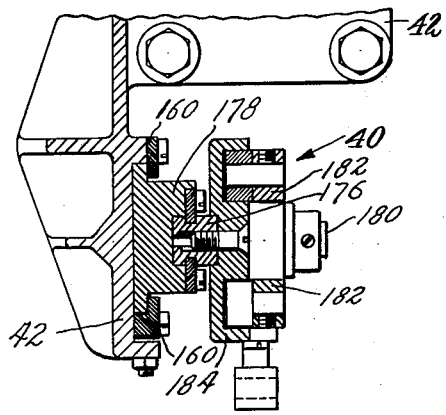
Fig. 12 is a view similar to Fig. 11 along the line XII—XII of Fig. 10 in the direction of the arrows and showing the welding jaw closing means and the sliding means for said jaws.
Figure 13:
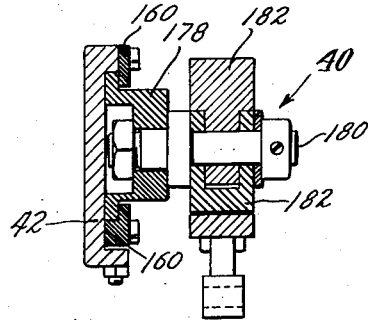
Fig. 13 is a view similar to Fig. 12 along the line XIII—XIII of Fig. 10 in the direction of the arrows and showing the pivoting means for the welding jaws.
Figure 1:
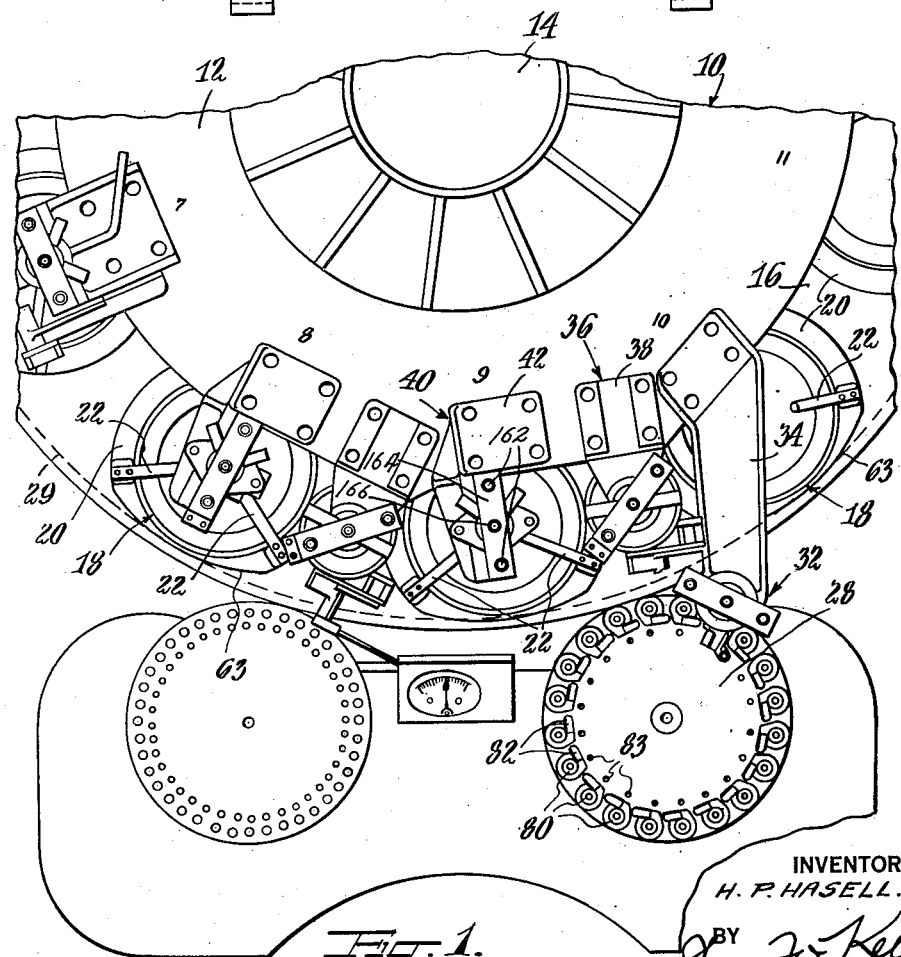
Fig. 1 is a fragmentary plan view of a filament mounting station, a filament shield bending and welding station and a discharge station of an automatic sealed beam incandescent lamp filament mounting machine.

Referring to the drawings and particularly to Fig. 1, an automatic filament mounting machine for a sealed beam lamp is designated by the reference numeral 10. In Fig. 1 are shown "Station 8," the filament mounting (clamping) station, "Station 9," the filament shield leg bending and welding station and "Station 10," the discharge station. The machine 10 comprises essentially an annular mounting plate 12, secured to a pedestal 14 and a reflector turret 16 carrying a plurality of reflector assembly heads 18, for example 10, indexable through a series of stations by a conventional mechanism (not shown).

Each of the heads 18 comprises essentially a generally U-shaped positioning bracket 20, which is mounted by means of its lower side to the turret 16 and provided with a plurality of centralizing fingers 22 (three in the present showing of Fig. 1) depending from the upper side and a reciprocating cam track operated reflector holder 24, shown particularly in Figs. 8 and 9. It will be understood that at "Station 10" the discharge station, and "Station 1" the parts loading station, the reflector holder 24 is in a lowered position, relatively close to the reflector turret 16. At all other stations the holder 24 is maintained in its "up" position by a cam track (not shown) so that a reflector assembly 26 located therein (by means of a locating slot, not shown) rests against the centralizing fingers 22 of the locating bracket 20.

At "Station 9," the filament shield bending and mounting station (Fig. 1) a filament shield holder turret 28 of a shield holder turret assembly is shown affixed to a base plate 29 of the frame of the machine 10 by means of a bracket 30 (Figs. 4 and 5). A filament shield leg bender 32 (Figs. 1, 6, 6A and 6B) is mounted by means of a bracket 34 (Fig. 1) on the mounting plate 12. A transfer device 36 (Figs. 1, 7, 7A, 10 and 11) is secured by means of a bracket 38 to the mounting plate 12, adjacent the bending device 32. Above "Station 9," the filament shield bending and mounting station, an automatic welding device 40 (Figs. 1, 8, 9, 10, 11, 12 and 13) is similarly mounted on the mounting plate 12 by a bracket 42.

Filament shield holder turret assembly

The shield holder turret assembly has a mounting and supporting bracket 44 secured on the turret mounting bracket 30. This bracket 44 is provided with a forward vertical hub portion 46 (Figs. 4 and 5), and a pair of rearward extending mounting lugs 48. A turret table mounting shaft 50 is rotatable within suitable ballbearings in the forward hub 46 and carries a ratchet wheel 52 to which the shield holder turret 28 is fixed by means of screws. The upper portion of the bracket 44 supports a ratchet wheel brake 56 to prevent undue spinning of the ratchet wheel 52. This brake 56 comprises a pair of levers or arms 58 suitably pivoted on the upper portion of the bracket 44 and provided with brake inserts 60, carried on their operating ends in engagement with the ratchet wheel 52. The desired friction between the inserts 60 and the ratchet wheel 52 is secured by means of a spring tensioned adjustment screw (Figs. 4 and 5) extending through the brake arms 58.

Turret indexing mechanism

An indexing mechanism for the turret 28 has a lower operating lever 62 (Fig. 3) provided with a roller 62' on its outer end, and is fixed to the lower portion of a lever shaft 64 (Fig. 5). A horizontal spring (not shown) extending from the lever 62 to a bracket projecting from the bracket 44 maintains said roller 62' in engagement with a cam track 63 (Fig. 1) located about each head 18 on the reflector turret 16. This shaft 64 (Fig. 5) is rotatable in the lugs 48 of the mounting bracket 44. A block 66 on the shaft 64 between the lugs 48 is provided for engagement with an adjustable stop (not shown) carried on the bracket 44 adjacent the block 66 for limiting the rotation of the shaft 64.

An upper operating lever 68 (Fig. 3) on the upper end of the shaft 64 carries an adjustable link 70 on its outer end. The inner end of the link 70 rotates on a pin 72 pivotably secured on a hub of a pawl arm 74. This arm 74 in turn is rotatable on the turret shaft 50 between the top of the forward hub 46 of the mounting and supporting bracket 44 and the ratchet wheel 52.

The upper end of the pin 72 carries a rotatable pawl 76 (Fig. 4), which is connected by means of a spring (not shown) to a second pawl (not shown). This second pawl is pivotable on a pin (not shown) extending from the upper portion of the block 44 adjacent the ratchet wheel brake 56.

Turret operation

It will be understood that during the indexing of a head 18, for example, from "Station 9," the filament shield bending and welding station, to "Station 10," the discharge station (Fig. 1), the roller 62' on the lower operating lever 62 engages the cam track 63 (Fig. 1) on the reflector turret 16 and is moved clockwise thereby (when viewed in Fig. 3) so that the upper lever 68, the adjustable link 70, the pawl arm 74 and hence the spring biased pawl 76, in engagement with the ratchet wheel 52, are likewise rotated clockwise. This limited clockwise rotation of the pawl 76 moves the ratchet wheel 52 and hence the shield holder turret 54 through a desired number of indexing degrees in a clockwise direction.

Filament shield holder turret

This annular turret 28 is provided with a plurality of shield bending heads or holders 80 (Figs. 1 and 3), for example 20, in the present showing, which are contoured to receive a shield 81 (Figs. 2 and 2A). A leg bending slot 82 is provided in the turret 28 adjacent each holder 80 for the leg bending operation. Of the twenty stations on the turret 28 only the leg bending station, the transfer station and the one or two intermediate stations therebetween are not available for the loading of shields 81 on the heads 80. Adjacent each slot 82 a guide or locating pin hole 83 (Fig. 3) is also provided in the turret 28 for use as hereinafter explained.

Filament shield bender

The bender bracket 34 on which the bender 32 is mounted (Figs. 3, 6 and 6A) carries a slide guide plate 84 and a pair of vertical mount rods 86 suitably thereabove. These mount rods 86 have their upper portions bridged by a top plate 88. This plate 88 supports a stationary piston rod 90 of an air or oil cylinder 92 which reciprocates vertically on the stationary piston rod 90. The reciprocating cylinder 92 is provided with a guide 93 in slidable engagement with one of the mount rods 86. The lower end of the cylinder 92 carries a slide plate 94 which is slidable in the slide plate guide 84 carried by the bender bracket 34. A two-way or reversing valve (not shown) actuated by a leg bender reciprocating cam (not shown) on the main drive shaft (not shown) of the machine 10 actuates and shuts off the oil cylinder 92.

A leg bending head 96 projects from the lower portion of the slide plate 94. This head, as shown in Figs. 6, 6A and 6B has a spring biased centering rod 98 for holding a filament shield 81 on a head 80 at the leg bending station of the shield holder turret 28. A rod-like bender or punch bar 102 depends from a mounting block 104 which is secured to the front portion of the bending head 96. This punch bar 102 engages a filament mounting leg 105 (Figs. 2 and 2A) of the shield 81 located above the leg bending slot 82, as hereinafter explained. A vertical locating pin 106 is carried on an arm 108, fixed to the side of the head 96. This guide pin 106 engages the locating or guide hole 83 adjacent each head 80 on the turret 28, as hereinafter explained.

Shield bender operation

It will be understood that after a shield 81 on a holder head 80 of the shield holder turret 28 has indexed into the leg bending station of the turret 28 (Fig. 1), the cylinder 92 is activated at a predetermined time in the operating cycle and slides downwardly on the piston rod 90. Simultaneously, the slide plate 94 and hence the bending head 96 move downwardly so that the guide pin 106 engages the locating hole 83 adjacent the filament shield head 80 (Figs. 1, 3, 6 and 6B) thus centering the punch bar 102 with respect to the filament shield leg 105. The punch bar 102, as shown in Fig. 6B, pushes the leg 105 downwardly into the slot 82 to form the desired right angle bend shown by dotted lines in (Fig. 2A) in the leg 105. The now bent shield is then transferred by the transfer device 36 to a reflector assembly 26 positioned on a reflector assembly head 18 at "Station 9."

*Transfer device*

The transfer device 36 (Figs. 7, 7A, 7B, 10 and 11) mounted on the bracket 38 has a mounting and supporting block 112 provided with an axial shaft hole, a hollow lower portion for containing a rotary drive 114 (Fig. 7B), as hereinafter explained, and a pair of upper mounting holes for securing therein a pair of vertical mount rods 116 (Figs. 7 and 7A). A top plate 118 (Fig. 7) bridges the upper ends of the mount rods 116 and supports therefrom an adjustable depending stationary cylinder piston rod 120 of an air or oil cylinder 122. This cylinder 122 is vertically reciprocable on said piston rod 120. The lower end of the cylinder 122 carries a shaft 124, slidable within a bushing 125 in the mounting and supporting block 112. The block 112 is rotatable with said bushing 125 in the block 112 of the transfer device 36 by means of a key. This shaft 124 extends substantially below the mounting and supporting block 112.

The upper portion of the cylinder 122 carries a valve operating arm 125' which makes contact with a stroke limiting (bypass) oil valve 126 for diminishing the oil pressure on the cylinder 122 during the downward shield pickup stroke.

*Rotary Drive*

The rotary drive 114 (Fig. 7B) has a stationary annular housing 127 provided with an oil delivery groove and secured in the annular opening in the lower portion of the mounting block 112. A rotary disc or rotor 128 is fixed to the bushing 125 on the shaft 124 and provided with a radial blade slot for mounting therein a fiber blade 130. This blade 130 is compressioned against the body 127 by means of a spring located in a radial hole behind the blade slot in the rotor 128. Below the rotary drive 114 in the mounting plate 112 an oil drip pan 132 (Figs. 7 and 7A) is secured to the outer portions of the bushing 125.

A collar 136 (Figs. 7 and 7A) for carrying a pair of adjustable stops 138 for engagement with a stationary stop plate (not shown) on the vertical portion of the transfer bracket 38, is secured about the lower portion of the bushing 125. These adjustable stops 138 limit the rotary motion of a transfer head 140 to properly align said head, as hereinafter explained, for the shield pick-up operation and the shield delivery and aligning operation above a reflector assembly 26 at "Station 9" of the machine 10.

*Transfer head*

This transfer head 140 (Figs. 7, 7A, 10 and 11) has a body 142 secured to the lower end of the reciprocating shaft 124. The right hand portion of the body 142, as viewed in Fig. 7, carries a stop 144 for engagement with a stop plate (not shown) carried on the mounting plate 12 of the machine 10, for limiting the downward vertical stroke of the reciprocating shaft 124 and hence the transfer head 140 during the pickup stroke. The front side of the body 142, as viewed in Fig. 7, is provided with a vertical slot for reception therein of a vertical guide 146 carried by the collar 136 thereabove for insuring the axial vertical reciprocating motion of the transfer head 140.

A shield transfer arm 148 (Figs. 7, 7A, 10 and 11) of general Z-like configuration is affixed to the left hand portions of the body 142 (Fig. 7), as by bolts. It is provided with a shield receiving or pickup groove 150 (Fig. 7) in its lower face, which is contoured to fit a hemispherical shield 81. This groove 150 is connected by a suitable passageway to a vacuum pick-up line 152 extending from the upper portions of the transfer arm 148 to a suitable vacuum system (not shown). The lower forward portion of this arm 148 (Figs. 7, 7A and 10) is provided with a locating pin 154 for engagement with a locating hole 83 (Figs. 1 and 6) in the turret 28 adjacent a shield holder 80 in the transfer station of the turret 28.

*Operation of the transfer device*

It will be understood that the shield transfer station of the turret 28 is located, one or two stations beyond the shield bending station as measured in a counter-clockwise direction in Fig. 1. After the shield holder turret 28 has been indexed, as hereinbefore explained, an oil cylinder reciprocating cam (not shown) on the main drive shaft of the machine 10, operates an adjacent vertical reciprocating two-way or reversing valve (also not shown), so that oil is admitted under pressure to the cylinder 122, thus causing the downward motion of the oil cylinder 122, the shaft 124 in the bushing 125 and the transfer head 140 on the shaft 124 until the stop 144 strikes the plate (not shown) on the mounting plate 12 of the machine 10 (Figs. 7, 7A and 7B). At the end of this downward shield pickup stroke the locating pin 154 on the transfer arm 148 engages a locating hole 83 (Figs. 6, 6A and 6B) in the shield holder turret 28, thus aligning the shield receiving groove 150 of the shield transfer arm 148 on the now bent filament shield 81, positioned on a shield holder or head 80 of the turret 26. The vacuum supplied through the line 152 holds the now bent shield 81 in the shield receiving groove 150 of the shield transfer arm 148.

It will be understood that (during the downward motion of the cylinder 122) slightly before the stop 144 engages its stop plate (not shown), on the mounting plate 12 of the machine 10, the valve operating arm 125' (Fig. 7) carried by the cylinder 122 opens the bypass valve 126 on the mounting and supporting block 112 to diminish the oil pressure on said cylinder 122. However, the cylinder and the parts attached thereto possesses sufficient inertia to travel the remaining distance of the pickup stroke so that the stop 144 carried on the body 142 of the transfer head 140 rests on its stop plate (not shown).

After the pickup of the now bent shield 81 has been affected, the oil cylinder reciprocating cam (not shown) on the main drive shaft reverses the flow of oil (by action of the two-way reversal valve (not shown)) so that the cylinder 122, the reciprocating shaft 124 within the bushing 125 and the transfer head 140 move upwardly to their normal rest position shown in Figs. 7 and 7A. This upward motion is limited by the action of cylinder head of the oil cylinder 122 engaging the piston rod 120.

Simultaneously a rotary drive cam (not shown) also on the main drive shaft opens another two-way or reversing valve (not shown) so that oil is admitted to the oil circulating groove in the body 127 (Fig. 7B) and drives the blade 130 and hence the rotor 128 on the bushing 125 and the vertical shaft 124, 90° in a clockwise direction (Fig. 11). At the end of this rotation the transfer arm 148 carrying the now bent shield 81 is aligned above a reflector assembly 26 held in a reflector head 18 at "Station 9."

Meanwhile the oil cylinder reciprocating cam (not shown but hereinbefore mentioned) again reverses the flow of oil to the reciprocating oil cylinder 122 causing the downward motion thereof until the now bent shield 81 is aligned above a filament 156 (Fig. 10) of the reflector assembly 26 and the now bent leg 105 of the shield 81 is properly positioned with respect to a leading-in conductor 158 of said assembly 26. It will be understood that due to the rotation of said head 140 this downward delivering motion of the transfer head 140 is no longer limited by the stop 144 carried by the body 142 of the transfer head 140. The bottom portion of the cylinder head of the oil cylinder 122 engages the top of the block 112 and thus limits this downward delivery motion. After the now bent shield has been aligned with respect to the filament 156 and the conductor 158, the automatic welder 40 welds the mounting leg 105 to the conductor 158.

*Automatic welder*

The welder bracket 42 for the automatic shield welder 40 has a vertical slide plate guide 160 (Figs. 8, 9, 10, 11, 12 and 13) and a pair of vertical mount rods 162 carried on the upper portions thereof. The upper ends of these mount rods 162 are bridged by a top plate 164 from which depends a stationary plunger rod 166 of an oil cylinder 168. This cylinder 168 reciprocates on the plunger rod 166 and is provided with a guide 170, in slidable engagement with one of the mount rods 162. The upper portion of the oil cylinder 168 also carries a welding circuit operating arm 172 (Fig. 9) for closing a welding circuit microswitch 174 secured to one of the mount rods 162. The switch 174 closes a welding circuit (not shown) as hereinafter explained.

A slide bar 176 is pinned to the lower portion of the oil cylinder 168. This slide bar 176 is slidable in a slide plate 178 which in turn slides within the stationary slide guide 160 in the welder bracket 42. The slide plate 178 carries an adjustable stop 179 (Fig. 10) for engagement with the top surface of the welder bracket 42 to limit the downward travel of the slide plate 178.

It will be understood that this slide plate 178 may be provided with a top flange for mounting a pair of spring biased slide rods thereon. A suitable flange bracket may be carried on the upper end of the oil cylinder 168 for supporting the switch arm 172 and for sliding on these slide rods. As the oil cylinder 168 descends, the slide rod springs are compressed and maintain a desirable upward thrust on the oil cylinder 168. The bottom portion of the slide plate 178 is provided with an outwardly extending shaft 180 on which a pair of welding arms 182 are pivoted in scissor-like fashion. The upper ends of the welder arms 182 are provided with suitable rollers which ride in the upwardly divergent cam tracks of an expander cam 184 carried on the lower end of the slide bar 176. Each of the welding arms 182 is provided with an electric voltage supply line (not shown) leading from the welding circuit, of which the micro switch 174 is a part.

*Operation of the automatic welder*

After the delivery stroke of the transfer device 36 has been completed, a welder cam (not shown) on the main cam shaft of the machine 10 opens a two-way reversing valve (not shown) to admit oil to the cylinder 168 and cause its downward motion on the plunger rod 166. It will be understood that the slide bar 176 and the slide plate 178 move downwardly together with the cylinder 168 until the stop 179 (Fig. 10) on the plunger plate 178 strikes the upper surface of the welder bracket 42.

It will be further understood that at this point in the cycle the slide plate 178 and the welding arms 182 carried on the shaft 180 projecting from the slide plate 178 have ceased their downward motion. However, the slide bar 176 and the expander cam 184 continue their downward motion with respect to the slide plate 178 and the rollers on the arms 182 ride upwardly on the upwardly diverging cam tracks of the expander cam 184, thus causing the upper ends of the electrode arms 182 to diverge from each other. This divergence of the upper portions of the welding arms 182 moves the lower or welding jaws 186 of the welding arms 182 toward each other until they clamp about a conductor 158 and a mounting leg 105 of the shield 81 positioned by the transfer device 36 on the leading-in conductor 158 of the reflector assembly 26.

It will be further understood that simultaneously with the clamping action of the welding jaws 186 that the adjustable micro switch operating arm 172 on the oil cylinder 168 closes the welding circuit micro switch 174 on the mount rod 162 to deliver welding current to the jaws 186.

After the completion of the welding operation the welding jaw cam (not shown) reverses the oil flow to the oil cylinder 168, by means of the two-way valve (not shown). The oil cylinder 168, the slide bar 176 and the expander cam 184 move upwardly, thus opening the welding jaws 186 and eventually returning the slide plate 178 and the welding arms 182 to their normal uppermost rest position. The transfer device 36 reciprocates upwardly in a manner hereinbefore explained, and is rotated 90° in a counterclockwise direction until it comes to rest above the transfer station of the shield holder turret 28. The reflector assembly 26 in the reflector assembly head 18 with the now mounted filament shield 81 thereon, is indexed from "Station 9," the filament shield bending and welding station, to "Station 10," the discharge station, of the automatic filament mounting machine 10.

Although a preferred embodiment of my invention has been disclosed, it will be understood that modifications may be made within the spirit and scope of the invention.

I claim:

1. Apparatus for mounting a filament shield on a leading-in conductor of a reflector lamp assembly, comprising a movable shield turret adapted to support said shield in a desired position, means for forming said shield while supported on said shield turret into a configuration adapted for the mounting of said shield on said leading-in conductor, means for engaging said formed shield, removing said formed shield from said shield turret and positioning said formed shield with respect to said leading-in conductor, means for securing said formed positioned shield to said leading-in conductor and means for operating said shield turret and the respective means of said apparatus in the proper time relation to each other.

2. Apparatus for mounting a filament shield on a leading-in conductor of a reflector lamp assembly comprising a shield turret adapted to support said shield in a desired position and indexable from station to station, means for forming said shield while supported on said shield turret into a configuration adapted for the mounting of said shield on said leading-in conductor, means for engaging said formed shield, removing said formed shield from said shield turret and positioning said formed shield with respect to said leading-in conductor, means for securing said formed positioned shield to said leading-in conductor and means for operating said shield turret and the respective means of said apparatus in the proper time relation to each other.

3. Apparatus for mounting a filament shield provided with a mounting leg on a leading-in conductor of a reflector lamp assembly comprising a movable shield turret adapted to support said shield in a desired position, means for bending said leg while said shield is supported on said shield turret into a configuration adapted for the mounting of said shield on said leading-in conductor, means for engaging said shield, removing said shield from said shield turret and positioning said bent leg with respect to said leading-in conductor, means for securing said bent positioned leg to said leading-in conductor and means for operating said shield turret and the respective means of said apparatus in the proper time relation to each other.

4. Apparatus for mounting a filament shield on a leading-in conductor of a reflector lamp assembly comprising a movable shield turret adapted to support said shield in a desired position, means for forming said shield while supported on said shield turret into a configuration adapted for the mounting of said shield on said leading-in conductor, means for engaging said formed shield, removing said formed shield from said shield turret and positioning said formed shield with respect to said leading-in conductor, means for welding said formed positioned shield to said leading-in conductor and means for operating said shield turret and the respective means of said apparatus in the proper time relation to each other.

5. Apparatus for mounting a filament shield provided with a mounting leg on a leading-in conductor of a reflector lamp assembly comprising a shield turret adapted to support said shield in a desired position and indexable from station to station, means for forming said leg while said shield is supported on said shield turret into a configuration adapted for the mounting of said shield on said leading-in conductor, means for engaging said shield, removing said shield from said shield turret and positioning said formed leg with respect to said leading-in conductor, means for welding said formed positioned leg to said leading-in conductor and means for operating said shield turret and the respective means of said apparatus in the proper time relation to each other.

References Cited in the file of this patent

UNITED STATES PATENTS

| | | |
|---|---|---|
| 2,069,086 | Donovan et al. | Jan. 26, 1937 |
| 2,280,573 | Flaws | Apr. 21, 1942 |